(12) United States Patent
Imbruglio

(10) Patent No.: US 9,563,834 B2
(45) Date of Patent: Feb. 7, 2017

(54) HIGH TEMPERATURE TOLERANT RFID TAG

(71) Applicant: HONEYWELL INTERNATIONAL INC., Morris Plains, NJ (US)

(72) Inventor: Richard Imbruglio, Portland, CT (US)

(73) Assignee: Honeywell International, Inc., Morris Plains, NJ (US)

( * ) Notice: Subject to any disclaimer, the term of this patent is extended or adjusted under 35 U.S.C. 154(b) by 0 days.

(21) Appl. No.: 14/782,652

(22) PCT Filed: Mar. 27, 2014

(86) PCT No.: PCT/US2014/031974
§ 371 (c)(1),
(2) Date: Oct. 6, 2015

(87) PCT Pub. No.: WO2014/168761
PCT Pub. Date: Oct. 16, 2014

(65) Prior Publication Data
US 2016/0048751 A1    Feb. 18, 2016

Related U.S. Application Data

(60) Provisional application No. 61/810,494, filed on Apr. 10, 2013.

(51) Int. Cl.
*G06K 19/06* (2006.01)
*G06K 19/077* (2006.01)
*G06K 19/02* (2006.01)

(52) U.S. Cl.
CPC ......... *G06K 19/07754* (2013.01); *G06K 19/02* (2013.01); *G06K 19/0773* (2013.01);
(Continued)

(58) Field of Classification Search
CPC .................. H01L 2924/00; H01L 2224/73265; H01L 2924/00014; H01L 2224/48247; H01L 2224/32245; G06K 19/07749; G06K 19/07783; G06K 19/07786; H01Q 1/2225; H01Q 1/24; H01Q 1/36; H01Q 1/38; H01Q 9/26
(Continued)

(56) References Cited

U.S. PATENT DOCUMENTS 6,236,223 B1 * 5/2001 Brady ................ G01R 31/2822
324/750.3
6,255,949 B1    7/2001 Nicholson et al.
(Continued)

FOREIGN PATENT DOCUMENTS

CN    2009/20050126    12/2009
WO    WO-2010/097704 A1    9/2010
WO    WO-2011/030362 A1    3/2011

*Primary Examiner* — Thien M Le
(74) *Attorney, Agent, or Firm* — Craige Thompson; Thompson Patent Law

(57) ABSTRACT

Apparatus and associated methods relate to a flexible high-temperature-tolerant RFID tag having an RFID integrated packaged in an SOT package attached with a high temperature solder to a flex circuit defining an RFID antenna. In an illustrative embodiment, the flexible high-temperature-tolerant RFID tag may be encapsulated in a flexible material. For example, the SOT packaged RFID integrated circuit may be encapsulated in rubber. In some embodiments the entire assembled RFID tag may be encapsulated in rubber or another flexible compound. In some embodiments, such flexible high-temperature-tolerant RFID tags may be advantageously used in high-temperature applications. In an exemplary embodiment, flexible high-temperature-tolerant RFID tags may be attached to products that may be flexible and/or deformable. In an exemplary embodiment, a flexible high-temperature-tolerant RFID tag may be molded into a rubber that will be used in a flexible application.

15 Claims, 3 Drawing Sheets

(52) U.S. Cl.
CPC .  G06K 19/07762 (2013.01); *G06K 19/07728* (2013.01); *G06K 19/07764* (2013.01)

(58) Field of Classification Search
USPC .................................. 235/492, 488, 375, 380
See application file for complete search history.

(56) References Cited

U.S. PATENT DOCUMENTS

| | | | |
|---|---|---|---|
| 6,340,878 B1 * | 1/2002 | Oglesbee | H02H 5/044 320/150 |
| 6,862,190 B2 * | 3/2005 | Olzak | H05K 1/141 174/262 |
| 6,914,566 B2 * | 7/2005 | Beard | H01Q 1/24 343/700 MS |
| 6,943,061 B1 * | 9/2005 | Sirinorakul | H01L 23/49513 438/113 |
| 7,857,998 B2 | 12/2010 | Dorfman | |
| 8,009,050 B2 * | 8/2011 | Kurokawa | G06K 19/0723 340/508 |
| 8,251,295 B2 | 8/2012 | Ritamaki et al. | |
| 8,552,730 B2 * | 10/2013 | Chiao | G01N 27/403 204/409 |
| 8,638,193 B2 * | 1/2014 | Margalef | G06K 19/07749 340/10.1 |
| 9,305,859 B2 * | 4/2016 | Williams | H01L 23/3677 |
| 2004/0238623 A1 | 12/2004 | Asp | |
| 2011/0304497 A1 * | 12/2011 | Molyneux | A43B 1/0054 342/42 |
| 2012/0268338 A1 | 10/2012 | Yoo et al. | |

* cited by examiner

HIGH TEMPERATURE TOLERANT RFID TAG

CROSS-REFERENCE TO RELATED APPLICATIONS

This application claims priority to the following U.S. Patent application(s), the entire disclosure of each of which is incorporated herein by reference: 61/810,494 High-temperature-tolerant RFID Tag Apr. 10, 2013

TECHNICAL FIELD

Various embodiments relate generally to high-temperature-tolerant RFID tags, and more specifically high-temperature-tolerant RFID tags having flex circuit substrates.

BACKGROUND

RFID tags are wireless non-contact devices that transmit an identifying signal to a receiver. Such tags are used in many industries. RFID tags may be attached to devices for inventory purposes. These tags may be used for protection against theft. A receiver located at a store entrance may receive signals from RFID devices as they are being transported out of the store, for example. Maintenance status can be monitored using RFID tags. For example, a user can query a device having an RFID tag. The received identifying signal can be used to look up the maintenance status of the queried device, for example. Manufacturing lines may use RFID tags to track parts being assembled into production units. For example, an assembly machine may query the product as to what revision of boards it may contain. In response to the board identification, the assembly machine may select a part that corresponds to the revision of the device being manufactured. RFID tags have been inserted into access control cards. Such cards permit or deny access to individuals according to predetermined rules of permission.

SUMMARY

Apparatus and associated methods relate to a flexible high-temperature-tolerant RFID tag having an RFID integrated packaged in an SOT package attached with a high temperature solder to a flex circuit defining an RFID antenna. In an illustrative embodiment, the flexible high-temperature-tolerant RFID tag may be encapsulated in a flexible material. For example, the SOT packaged RFID integrated circuit may be encapsulated in rubber. In some embodiments the entire assembled RFID tag may be encapsulated in rubber or another flexible compound. In some embodiments, such flexible high-temperature-tolerant RFID tags may be advantageously used in high-temperature applications. In an exemplary embodiment, flexible high-temperature-tolerant RFID tags may be attached to products that may be flexible and/or deformable. In an exemplary embodiment, a flexible high-temperature-tolerant RFID tag may be molded into a rubber that will be used in a flexible application.

Various embodiments may achieve one or more advantages. For example, some embodiments may be suitable for subsequent high-temperature processing. Some exemplary RFID tags may be dipped in high-temperature baths or rubber, for example. In an exemplary embodiment, a flexible high-temperature-tolerant RFID tag may be exposed to a high-temperature molding compound, for example. In some embodiments, a flexible high-temperature-tolerant RFID may be coupled to a flexible article. For example, a rubber glove may retain a measure of flexibility while simultaneously providing wireless RFID identification to a receiver.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
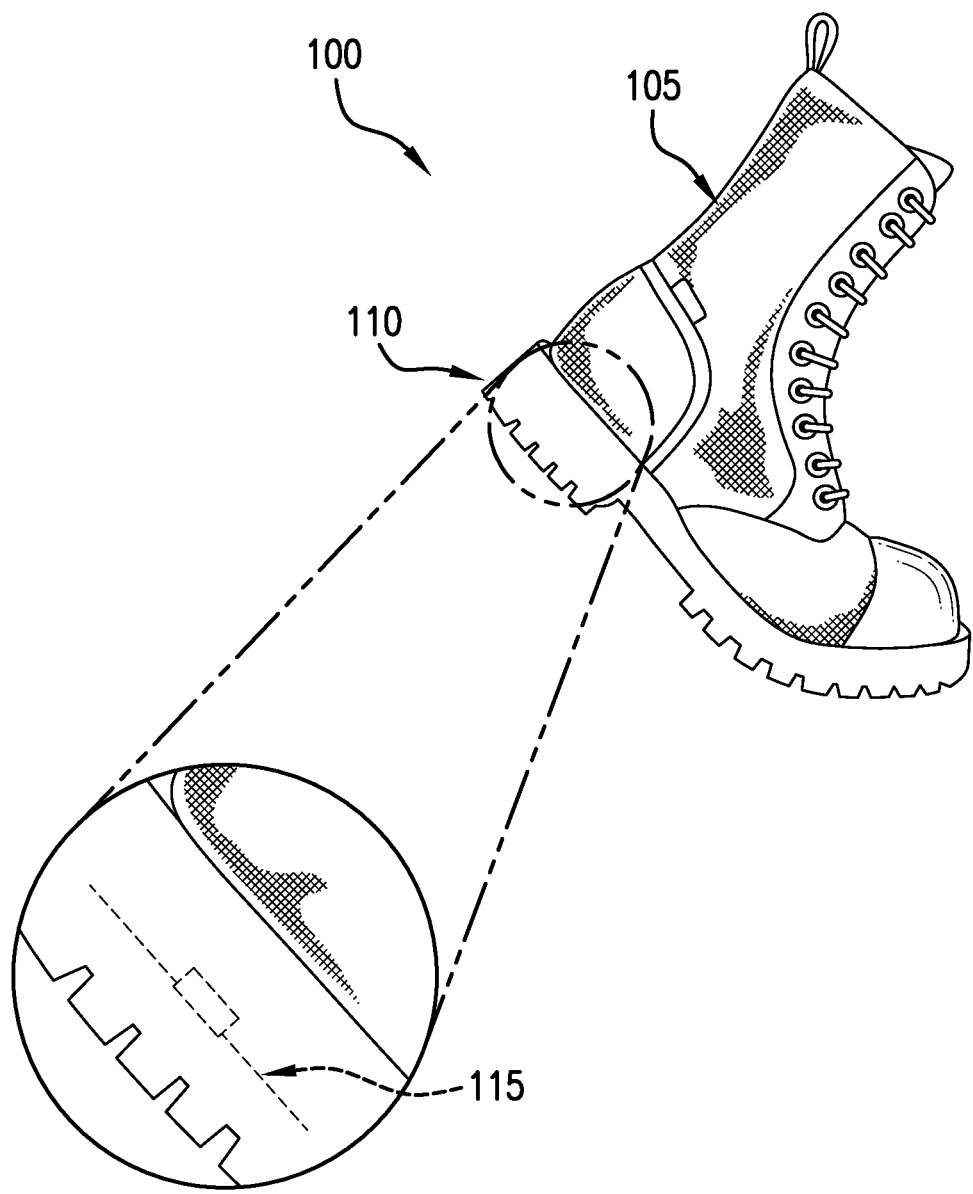
FIG. 1 depicts an exemplary high-temperature-tolerant RFID tag system molded within a boot heel.

FIG. 1 depicts an exemplary high-temperature-tolerant RFID (HTID) tag system within a boot heel. In this figure, a traceable boot system 100 is depicted. The depicted traceable boot system 100 has a boot 105 that has a heel portion 110. The heel portion 110 includes a HTID tag system 115. According to one embodiment, the HTID tag system 115 may bend and flex in response to bend pressures applied to the heel portion 110 of a person walking in the boot 105. In an exemplary embodiment, the HTID tag system 115 is added to the heel portion 110 of the boot 105 during a molding manufacturing step.

Figure 2:
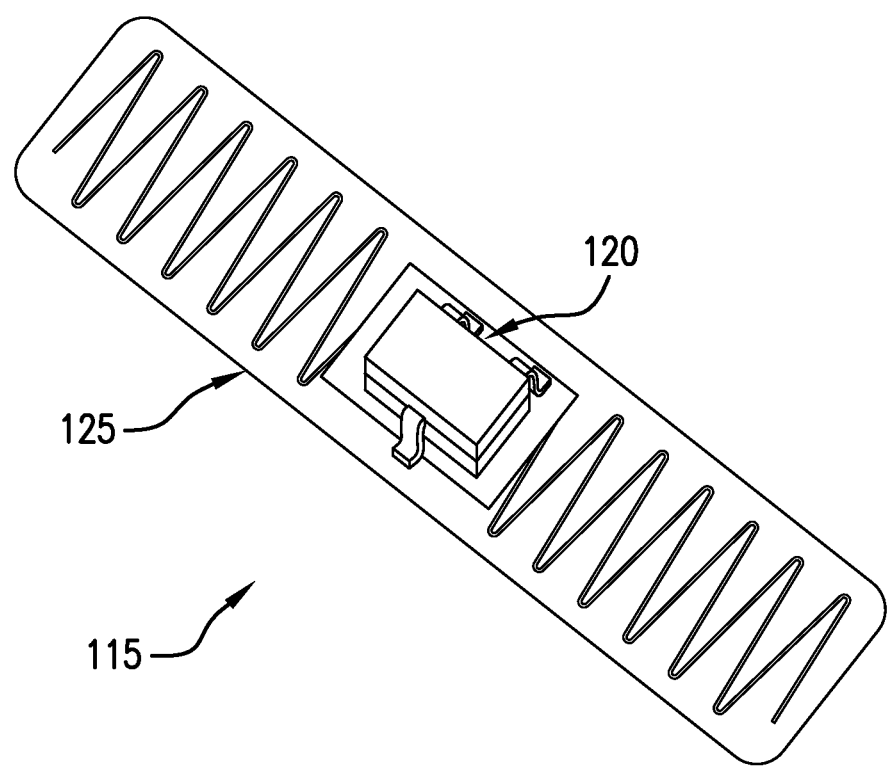
FIG. 2 depicts a high-temperature-tolerant RFID tag system.

FIG. 2 depicts a HTID tag system 115 having a packaged integrated circuit (IC) 120 that has a flex circuit 125. According to one embodiment, the packaged IC 120 may include a surface mount package such as an off-the-shelf small outline transistor (SOT). For example, an SOT-323 surface mountable integrated circuit, such as that manufactured by Alien Technologies as model number ALC-360-SOT, may be used. The flexible circuit may form an RFID antenna (e.g., dipole) for operation of the HTID tag system 115. In accordance with another embodiment, the packaged IC 120 may be mounted on the flex circuit 125 using a high temperature (above 450° C.) process containing silver solder (e.g., silver-containing, Ag) techniques. In various examples, secure mechanical attachment and electrical bonding may advantageously use, for example, high temperature soldering materials and methods to provide the completed HTID tag system 115 with the ability to be exposed to subsequent high temperature processes without causing re-flow of the solder and subsequent circuit failure. For example, an SOT-323 IC may be soldered to a flexible circuit using high temperature soldering materials and techniques and subsequently coating the entire assembly using a flexible material such as rubber which has a melting range of 98-175° C. In some implementations, a silver soldering may withstand the temperatures experienced by the HTID tag system 115 during the molding process steps without compromising electrical integrity.

In another preferred embodiment, the HTID tag system 115 may be formed within a vulcanized rubber material. For example, a tire may be formed using a compression molding technique of vulcanization which exposes a polymer material (e.g., polyisoprene, styrene-butadiene rubber) to a temperature of 170° C. The HTID tag system may be inserted within the rubber material as part of the tire molding process.

In accordance with another embodiment, the HTID tag system 115 may be formed within the core of a downhill alpine ski. The curing process associated with the forming of an alpine ski includes an oven temperature of 210° C. Typical RFID systems would not be flexible enough to bend with an alpine ski in use or would likely have an electrical failure due to exposure to temperatures sufficient to reflow lead-based solder during manufacture.

In an exemplary embodiment, a plastic molding process known as injection molding may be used to form one or more plastic products and having the HTID tag system 115 contained therein. Plastic injection molding temperatures may exceed 300° C. and still not compromise the electrical contacts between the packaged IC 120 and flexible circuit 125.

Figure 3:
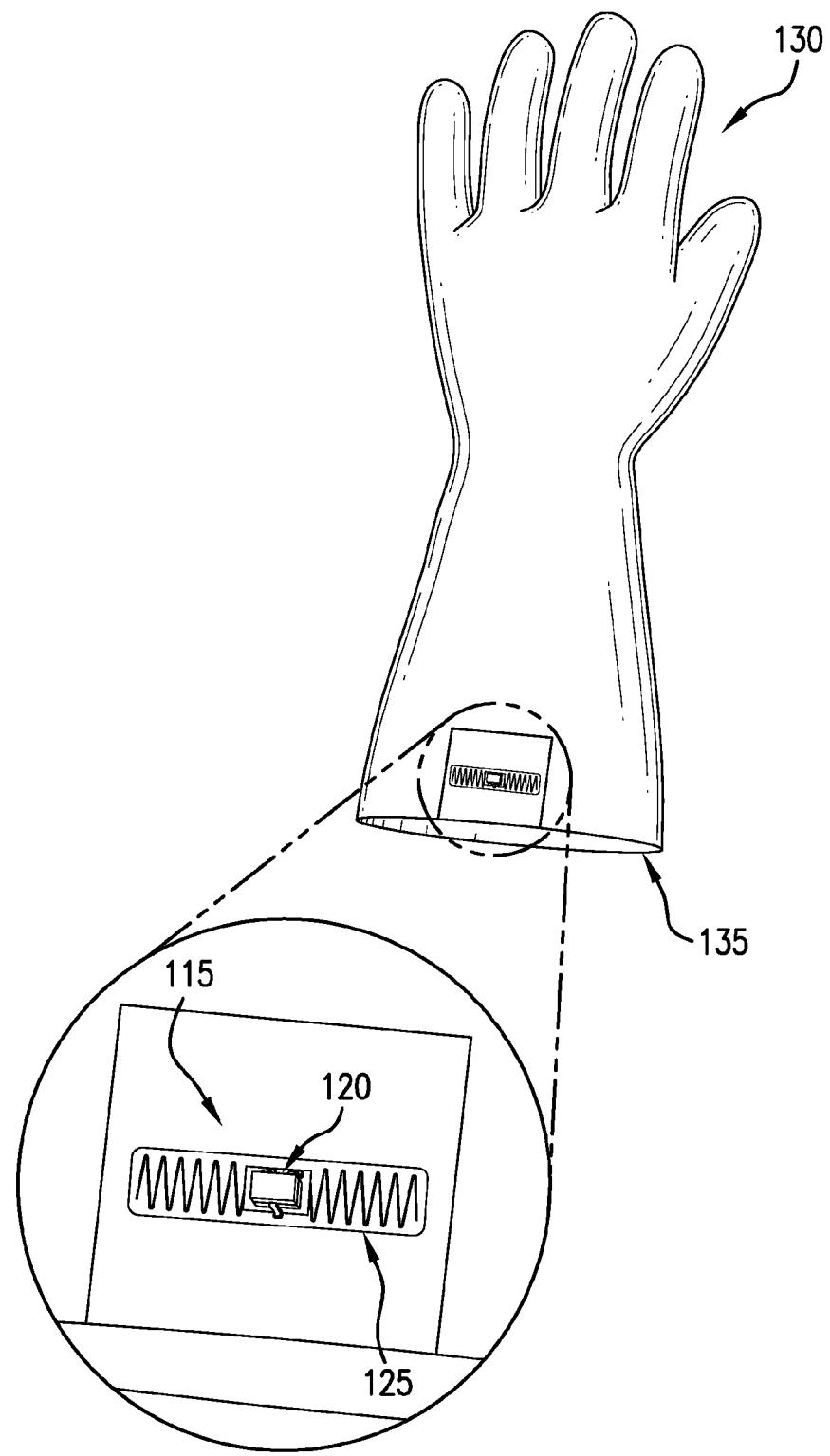
FIG. 3 depicts an exemplary flexible high-temperature-tolerant RFID tag system molded within a rubber glove.

FIG. 3 depicts an exemplary flexible high-temperature-tolerant RFID tag system molded within a rubber glove. In the FIG. 3 embodiment, an exemplary flexible high-temperature-tolerant RFID tag 115 is embedded into a rubber glove 130 near the opening 135. In various embodiments, flexible high-temperature-tolerant RFID tags may be located in various locations. For example, in some embodiments, an RFID tag may be located at a back of the hand region, for example. An RFID tagged glove may be manufactured by attaching the RFID to the glove before the glove has received its final dipping operation. The glove may then be dipped one or more additional times, during which the RFID may be coated by the dipped material (e.g., nitrile rubber). The dipping operation may expose the RFID tag to high temperatures, for example. A high-temperature-tolerant RFID tag may permit manufacturing operations that would otherwise damage an RFID tag. In some embodiments, objects that have heretofore been unable to have an imbedded RFID tag to now have an imbedded RFID tag. For objects that are designed to be flexible, such flexible RFID tags may facilitate RFID tag capabilities without impairing the objects operation.

In an illustrative embodiment, a flexible high-temperature-tolerant RFID tag may include an RFID integrated circuit packaged in a Small-Outline Transistor (SOT) package having a plurality of leads. In an exemplary embodiment, the SOT package may be an SOT-323 type package. In an exemplary embodiment, the RFID integrated circuit may be a passive type RFID integrated circuit. In some embodiments, the flexible high-temperature-tolerant RFID tag may include a flex circuit defining an RFID antenna and a plurality of connection pads arranged to receive the plurality of leads. One or more antennae may be included on the flex circuit. Various materials may be used in the flex circuit. For example, the flex circuit may include fluorocarbon. In an exemplary embodiment, the flex circuit may include aramid. In some embodiments, the plurality of SOT packaged RFID integrated circuit leads may be attached to the plurality of contact pads of the flex circuit by a high-temperature solder. For example silver solder may be used to provide a solder connection between the plurality of contact pads and a corresponding plurality of leads.

Although various embodiments have been described with reference to the Figures, other embodiments are possible. For example, the size and shape of the flexible circuit 125 may differ from one application to the next and will depend upon the application in which it is used as well as the need to tune the antenna for optimum communication. The packaged IC 120 may be available from a number of manufacturers as is common in the electronic components industry which follow standard package sizes in a variety of temperature ranges. In various embodiments, more than one HTID tag system may be utilized in close proximity to one another and reside externally as well as internally to the overall design application.

In various implementations, an RFID inlay process may provide simultaneously high temperature capabilities and flexibility. Some embodiments may further provide a low (e.g., thin) profile or form factor. Accordingly, thin form factor embodiments may be incorporated in a variety of textiles, such as personal protective equipment (PPE). Examples of PPE that may incorporate embodiments as described herein may include, by way of example and not limitation, turn-out gear (e.g., for fire fighters), boots, fall protection harnesses, belts, head gear, protective suits, self-contained breathing apparatus, respirators, masks, protective headgear, protective gloves (e.g., chemical, electrical, abrasion, or cut resistant), or safety belts.

Current flexible inlay designs use aluminum or copper printed on a carrier material and subsequently having the RFID processor bonded to an antenna using PET (polyethylene terephalate). PET has a glass transition temperature of under 80° C. which can lead to detachment of the IC from the antenna in environments exceeding 80° C. Ceramic RFID tags have the ability to resist high temperatures, in some cases in excess of 285° C., however they are extremely rigid and do not have the ability to withstand physical flexing without damage. Use of lead-free solder also provides the added benefit of meeting the RoHS directive to restrict certain dangerous substances commonly used in electronic equipment.

In one exemplary aspect, a device includes a high-temperature-tolerant RFID tag system that includes a SOT-packaged integrated circuit securely attached to a flexible circuit substrate. The flexible circuit substrate contact with a flex circuit forming an RFID antenna. The high temperature solder may provide electrical continuity between said SOT packaged integrated circuit and the flex circuit.

In some examples, the antenna formed in the flexible substrate may be a patch antenna.

Various implementations may include an HTID inlaid in flexible material, such as rubber or plastic.

For example, some embodiments may involve a compression molding process. Once the uncured rubber has completed the mixing process, the uncured rubber is generally presented to the molding operation in either slab form or strip form. If the uncured rubber may be presented in slab form, the uncured rubber may be then added to a mill to be warmed up. Once the uncured rubber is warm (e.g., between about 180 F and 200 F) the uncured rubber may be removed from the mill in the desired form, generally in strips. The stripped uncured rubber may be then taken to a prepping operation. This can be an extruder, a barwell, a gear pump, or any other equipment that can form the stripped uncured rubber into a desired shape, size, and weight. The shaped uncured rubber, in its desired form, may be taken to the molding operation. The uncured rubber in its desired shape may be then positioned into a cavity of a specific open mold. The mold may be closed and a specific time, temperature (e.g., about 360 F-390 F), and pressure may be applied to the mold. The uncured rubber may flow to fill the empty cavity of the mold when under pressure. Once the specific time at the specific temperature under a specific pressure is complete, the cured rubber may be removed from the mold. The rubber, now cured, may maintain and retain the shape of the mold cavity throughout its life.

For example, some embodiments may involve a transfer molding process. Once the uncured rubber has completed the mixing process, the uncured rubber may be generally presented to the molding operation in slab form. The uncured rubber may be then added to a mill to be warmed up. Once the uncured rubber is warm (e.g., between about 180 F and 200 F) the uncured rubber may be removed from the mill in the desired form, generally a slab in a specific size and weight. The shaped uncured rubber, in its desired form, may be taken to the molding operation. The uncured rubber in its desired shape may be then positioned into a pot, generally cold to slightly warm. A ram the size of the pot may apply pressure to the uncured rubber forcing it to flow through sprues into the cavity of the mold. The mold may be closed and a specific time, temperature (e.g., about 360 F-390 F), and pressure may be applied to the mold. The uncured rubber may flow to fill the empty cavity of the mold. Once the specific time at the specific temperature under a specific pressure is complete, the cured rubber may be removed from the mold. The rubber, now cured, may maintain and retain the shape of the mold cavity throughout its life.

For example, some embodiments may involve an injection molding process. Once the uncured rubber has completed the mixing process, the uncured rubber is generally presented to the molding operation in either slab form or strip form. If the uncured rubber is presented in slab form, the uncured rubber is then added to a mill to be warmed up. Once the uncured rubber is warm (e.g., between about 180 F and 200 F) the uncured rubber may be removed from the mill in the desired form, strips. The stripped uncured rubber is then taken to the molding operation. An inline extruder warms the uncured rubber and forces the uncured rubber to flow through sprues into the cavity of the mold. The uncured rubber will flow to fill the empty cavity of the closed mold. The uncured rubber in the closed mold may be under pressure for a specific time and temperature (e.g., about 360 F-390 F). Once the specific time at the specific temperature under a specific pressure is complete, the cured rubber may be removed from the mold. The rubber, now cured, may maintain and retain the shape of the mold cavity throughout its life.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A flexible high-temperature-tolerant RFID tag comprising:
   an RFID integrated circuit packaged in a Small-Outline Transistor 323 (SOT-323) package having a plurality of leads; and
   a flex circuit defining an RFID antenna and a plurality of connection pads arranged to receive the plurality of leads,
   wherein the plurality of SOT-323 packaged RFID integrated circuit leads are attached to the plurality of contact pads of the flex circuit by a high-temperature silver solder, and,
   wherein the RFID integrated circuit and the flex circuit are embedded in a plastic formed via injection molding.

2. The flexible high-temperature-tolerant RFID tag of claim 1, wherein the RFID integrated circuit is a passive RFID integrated circuit.

3. The flexible high-temperature-tolerant RFID tag of claim 1, wherein the flexible high-temperature-tolerant RFID tag is coated with a flexible coating.

4. The flexible high-temperature-tolerant RFID tag of claim 3, wherein the flexible coating comprises a rubber coating.

5. The flexible high-temperature-tolerant RFID tag of claim 1, further comprising a glove.

6. A flexible high-temperature-tolerant RFID tag comprising:
   an RFID integrated circuit packaged in a Small-Outline Transistor (SOT) package having a plurality of leads; and
   a flex circuit defining an RFID antenna and a plurality of connection pads arranged to receive the plurality of leads,
   wherein the plurality of SOT packaged RFID integrated circuit leads are attached to the plurality of contact pads of the flex circuit by a high-temperature solder, and,
   wherein the RFID integrated circuit and the flex circuit are embedded in a plastic formed via injection molding.

7. The flexible high-temperature-tolerant RFID tag of claim 6, wherein the high-temperature solder comprises silver solder.

8. The flexible high-temperature-tolerant RFID tag of claim 6, wherein the RFID integrated circuit is a passive RFID integrated circuit.

9. The flexible high-temperature-tolerant RFID tag of claim 6, wherein the SOT package is an SOT-323 package.

10. The flexible high-temperature-tolerant RFID tag of claim 6, wherein the flexible high-temperature-tolerant RFID tag is coated with a flexible coating.

11. The flexible high-temperature-tolerant RFID tag of claim 10, wherein the flexible coating comprises a rubber coating.

12. The flexible high-temperature-tolerant RFID tag of claim 6, wherein the flex circuit's dielectric comprises fluorocarbon.

13. The flexible high-temperature-tolerant RFID tag of claim 6, wherein the flex circuit's dielectric comprises aramid.

14. The flexible high-temperature-tolerant RFID tag of claim 6, further comprising a glove.

15. The flexible high-temperature-tolerant RFID tag of claim 6, further comprising an article of footwear.

* * * * *